US 8,644,306 B2

United States Patent
Kimn et al.

(10) Patent No.: US 8,644,306 B2
(45) Date of Patent: Feb. 4, 2014

(54) METHOD AND APPARATUS FOR VOIP VIDEO COMMUNICATION

(75) Inventors: Soung-Kwan Kimn, Osan-si (KR); Hyun-Min Yoon, Suwon-si (KR); Hui-Jae Lee, Suwon-si (KR); Ji-Youn Jung, Seoul (KR); Myeon-Kee Youn, Incheon (KR); Seong-Joon Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1937 days.

(21) Appl. No.: 11/643,815

(22) Filed: Dec. 22, 2006

(65) Prior Publication Data

US 2007/0160057 A1 Jul. 12, 2007

(30) Foreign Application Priority Data

Jan. 11, 2006 (KR) .................. 10-2006-0003281

(51) Int. Cl.
*H04L 12/28* (2006.01)
*H04N 7/173* (2011.01)
*H04N 5/50* (2006.01)

(52) U.S. Cl.
USPC ..... 370/389; 370/395.2; 370/493; 348/14.12; 348/616; 725/25; 725/32; 725/47

(58) Field of Classification Search
USPC .......... 348/14.01, 14.02, 14.03, 14.04, 14.07, 348/14.08, 14.09, 14.1, 14.11, 14.12, 14.13, 348/14.14, 14.15, 14.16, 725, 616, 473; 386/46, 124, 125, 105, 224, 225, 243; 370/352, 353, 354, 356, 395.2, 493, 370/389; 725/74, 76, 75, 77, 62, 36, 25, 28, 725/32, 34, 41, 44, 47

See application file for complete search history.

(56) References Cited

U.S. PATENT DOCUMENTS

| | | | | |
|---|---|---|---|---|
| 4,590,520 A | * | 5/1986 | Frame et al. ................ | 348/616 |
| 5,758,258 A | * | 5/1998 | Shoff et al. ................ | 725/116 |
| 6,585,521 B1 | * | 7/2003 | Obrador ...................... | 434/236 |
| 6,690,878 B1 | * | 2/2004 | Jeong et al. ................ | 386/240 |
| 2001/0001159 A1 | * | 5/2001 | Ford ............................ | 725/25 |
| 2004/0062264 A1 | * | 4/2004 | Adams ........................ | 370/432 |
| 2004/0168121 A1 | * | 8/2004 | Matz ........................... | 715/513 |
| 2005/0163164 A1 | * | 7/2005 | Cramer et al. .............. | 370/486 |

(Continued)

FOREIGN PATENT DOCUMENTS

| KR | 1020030013627 | 2/2003 |
|---|---|---|
| KR | 1020050031012 | 4/2005 |

(Continued)

OTHER PUBLICATIONS

Korean Decision of Grant corresponding to Korean Patent Application No. 2006-0003281, issued on May 29, 2007.

(Continued)

*Primary Examiner* — Marcus R Smith
*Assistant Examiner* — Saba Tsegaye
(74) *Attorney, Agent, or Firm* — H.C. Park & Associates, PLC (57) ABSTRACT

In a Voice over Internet Protocol (VoIP) video communication method and apparatus, first and second VoIP-based terminals store video event indexes and images mapped thereto with respect to state information of a user and terminal, and establish a session using session establishment information defining the video event. The first terminal then transmits a data packet including the video event index, and the second terminal receives the data packet and outputs an image mapped to the video event index of the images stored in advance. Thus, by transmitting and receiving a predefined index alone without transmitting user and terminal states as a real time data-type image, the VoIP video communication method and apparatus prevent unnecessary waste of bandwidth in video communication.

18 Claims, 7 Drawing Sheets

(56) References Cited

U.S. PATENT DOCUMENTS

2006/0195870 A1* 8/2006 Teichner et al. ............... 725/75
2006/0253888 A1* 11/2006 Senga et al. ................. 725/123
2008/0136895 A1* 6/2008 Mareachen ............... 348/14.03

FOREIGN PATENT DOCUMENTS

| KR | 10-2005-0104850 | 11/2005 |
| KR | 10-2006-0066938 | 6/2006 |

OTHER PUBLICATIONS

J. Rosenberg, et al., "Request for Comments: 3261 SIP: Session Initiation Protocol", The Internet Society, Jun. 2002, pp. 1-269.

H. Schulzrinne, et al., "Request for Comments: 2833 RTP Payload for DTMF Digits, Telephony Tones and Telephony Signals", The Internet Society, May 2000, pp. 1-30.

* cited by examiner

```
v=0
o=VIDEO-TELEPHONE 0 0 IN IP4 192.168.83.210
s=VIDEO-TELEPHONE-SESSION
c=IN IP4 192.168.83.210
t=0 0
m=AUDIO 49648 RTP/AVP 0 8 18 106
a=rtpmap : 0 PCMU/8000
a=rtpmap : 8 PCMU/8000
a=rtpmap : 16 G729/8000
a=rtpmap : 106 telephone-event/8000
a=fmtp: 106 0~15
m=video 49650 RTP/AVP 34 31
a=rtpmap : 34 H263/90000
a=rtpmap : 31 H261/90000
a=rtpmap : 107 video-telephone-event    ← SENTENCE A, EXPRESS CLEARLY RTP TYPE OF A VIDEO-PHONE EVENT CHANNEL
a=fmtp: 107 0~127                        ← SENTENCE B, EXPRESS CLEARLY RANGE OF VIDEO-PHONE EVENT NUMBERS
       SENTENCE B    SENTENCE A
```

```
VIDEO EVENT ESTABLISHMENT UNIT

SCREEN BLANK: SYSTEM/USER DEFINITION 1/USER DEFINITION 2/···/USER DEFINITION N
SCREEN STANDBY: SYSTEM/USER DEFINITION 1/USER DEFINITION 2/···/USER DEFINITION N
TERMINAL EVENT 1: SYSTEM/USER DEFINITION 1/USER DEFINITION 2/···/USER DEFINITION N
TERMINAL EVENT 2: SYSTEM/USER DEFINITION 1/USER DEFINITION 2/···/USER DEFINITION N
              ⋮
TERMINAL EVENT N: SYSTEM/USER DEFINITION 1/USER DEFINITION 2/···/USER DEFINITION N
```

FIG. 8

METHOD AND APPARATUS FOR VOIP VIDEO COMMUNICATION

CLAIM OF PRIORITY

This application makes reference to, incorporates the same herein, and claims all benefits accruing under 35 U.S.C. §119 from an application for APPARATUS AND METHOD FOR VISUAL COMMUNICATION BY USING VoIP, earlier filed in the Korean Intellectual Property Office on the 11 Jan. 2006 and there duly assigned Serial No. 10-2006-0003281.

BACKGROUND OF THE INVENTION

1. Technical Field

The present invention relates to a method and apparatus for transmitting and receiving an image event in a video telephone.

2. Related Art

Voice over Internet Protocol (VoIP) refers to a technique of transmitting circuit-switched voice data over a packet-switched, Internet protocol (IP)-based data network, such as a local area network (LAN), a wide area network (WAN), a virtual private network (VPN), or public Internet. The VoIP provides PC-to-PC, PC-to-phone or phone-to-phone services.

VoIP began with the introduction of the Internet phone by Vocaltec Company in 1995. Software from Vocaltec Company compresses a voice signal, converts the signal into an IP packet, and transmits the packet over Internet, which can be called a PC-to-PC scheme. This scheme has a limitation in that a receiver and a sender have to access at the same time and use the same software. Since 1995, the Internet phone has been growing rapidly. Recently, a VoIP gateway, which is an interface between the Internet and public switched telephone network (PSTN), enables VoIP in a PC-to-phone or phone-to-phone scheme.

VoIP is 50% to 80% cheaper than conventional international calling, due to use of the Internet instead of the PSTN. Thus, many domestic and foreign companies are fiercely competing for the market. However, because of the nature of a packet-switching network, voice quality has still not reached a satisfactory level. Nevertheless, the Internet phone has rapidly developed with the proliferation of the Internet and technology development, and while the Internet phone is still less widely used than conventional telephone service such as a PSTN, it is likely destined to replace conventional telephone service in the future.

A video telephone data channel is composed of two real-time transport protocol (RTP) channels, which are a voice data channel and a video data channel. The voice data channel includes out-band signaling for a separate phone event process (RFC 2833) in order to receive a dual-tone multi-frequency (DTMF) signal.

In this case, if a transmitter changes state information in response to a user's state information, image data on the changed state information is transmitted to a receiver. This is because there is no definition for a video event.

There may be a case where the user changes the state information into a screen blank, standby, etc., or real-time screen data such as a camera failure or a transmission/reception error of an application program is not necessary. According to the typical VoIP video communication method, even in such a case, the image data on the state information has to be transmitted and received, and thus bandwidth is wasted.

Moreover, image data occupies a tenfold wider bandwidth than general voice data, so that the waste of bandwidth is quite severe.

SUMMARY OF THE INVENTION

It is an object of the present invention to provide a method and apparatus for video communication based on Voice over Internet Protocol (VoIP), wherein a video event is defined and only an index corresponding to the event is transmitted and received as state information of a user and a terminal in video communication.

A first aspect of the present invention provides a method for video communication based on VoIP, the method comprising the steps of: establishing a session between first and second terminals using session establishment information defining a video event about state of a user or a terminal; creating and transmitting, at the first terminal, a data packet including the video event index; and, receiving at the second terminal, the data packet, extracting the video event index, and outputting an image mapped to the extracted video event index among at least one pre-stored image.

In this regard, the video event may comprise at least one of a screen blank event, a screen standby event, a terminal camera failure event, a terminal image data transmission disable event and a terminal image data reception disable event. In addition, the data packet may have the format of a Real-time Transport Protocol (RTP) packet.

The step of creating the data packet may comprise creating an RTP packet including the video event Payload type in the Payload Type field, and the RTP packet may further include user-defined image data corresponding to the video event in a Payload field. In this regard, the step of outputting the image at the second terminal may involve extracting and outputting user-defined image data included in the Payload field of the RTP packet.

In addition, the method may further comprise the step of inputting, by a user, of information on whether a terminal uses user-defined image data.

The step of creating the data packet may comprise creating a data packet which includes a video event Start/End flag indicating the start/end of the video event. In this step, the second VoIP-based terminal may output an image mapped to the video event index in the case of receiving the data packet including a video event Start flag, and the VoIP-based terminal may discontinue input of the image in the case of receiving a data packet including a video event End flag.

In the step of establishing a session between the first and second terminals, the session may by established using Session Initiation Protocol (SIP).

A second aspect of the present invention provides a VoIP-based terminal for video communication, the terminal comprising: a memory for mapping and saving a video event index relating to a user state or a terminal state and at least one image; a session establishment unit for establishing a session between terminals using session establishment information defining the video event; and a video event processor for transmitting and receiving a data packet including the video event index, and for retrieving from memory and outputting an image mapped to the video event index contained in the received data packet.

In this case, the video event may comprise at least one of a screen blank event, a screen standby event, a terminal camera failure event, a terminal image data transmission disable event and a terminal image data reception disable event, and the data packet may have the format of an RTP packet.

The video event processor may comprise a video event transmission module for creating and sending the RTP packet including a Payload Type field and the video event index, and a video event reception module for extracting the video event index contained in the received RTP packet, and for retrieving from memory and outputting an image mapped to the video event index.

The video event transmission module may create and transmit an RTP packet including user-defined image data corresponding to the video event index and contained in a Payload field of the RTP packet, and the video event reception module may extract and output the user-defined image data contained in the Payload field of the received RTP packet.

In this regard, the data packet may further comprise a video event Start/End flag indicating the start/end of the video event, and thereby the video event processor may output an image mapped to the video event index in the case of receiving a data packet including the a video event Start flag, and the video event processor may discontinue output of the image in the case of receiving a data packet including a video event End flag.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, an apparatus and method for transmitting and receiving a video event in video communication according to the present invention will be described in detail with reference to the accompanying drawings.

Figure 1:
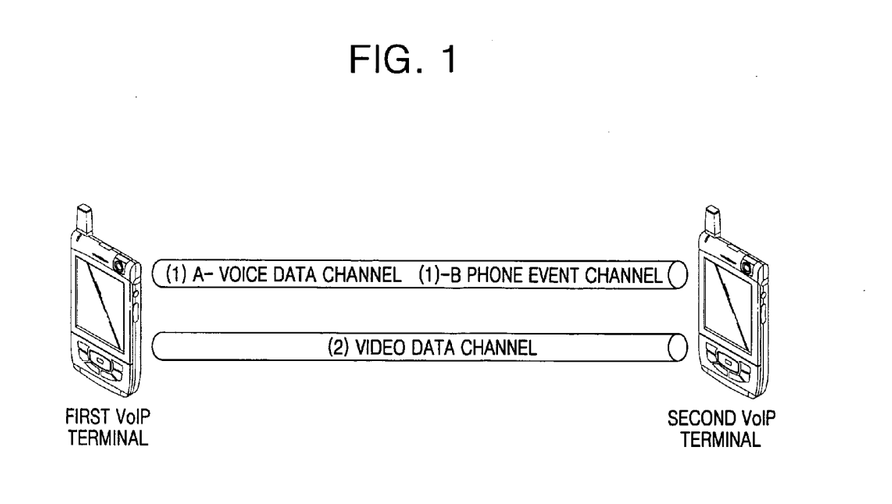
FIG. 1 is a diagram illustrating the configuration of a Voice over Internet Protocol (VoIP) video telephone data channel.

FIG. 1 is a diagram illustrating the configuration of a Voice over Internet Protocol (VoIP) video communication data channel.

The video telephone data channel is composed of two real-time transport protocol (RTP) channels, which are a voice data channel and a video data channel. The voice data channel includes out-band signaling for a separate phone event process (RFC 2833) in order to receive a dual-tone multi-frequency (DTMF) signal.

In this case, if a transmitter changes state information in response to a user's state information, image data on the changed state information is transmitted to a receiver. This is because there is no definition for a video event.

Figure 2:
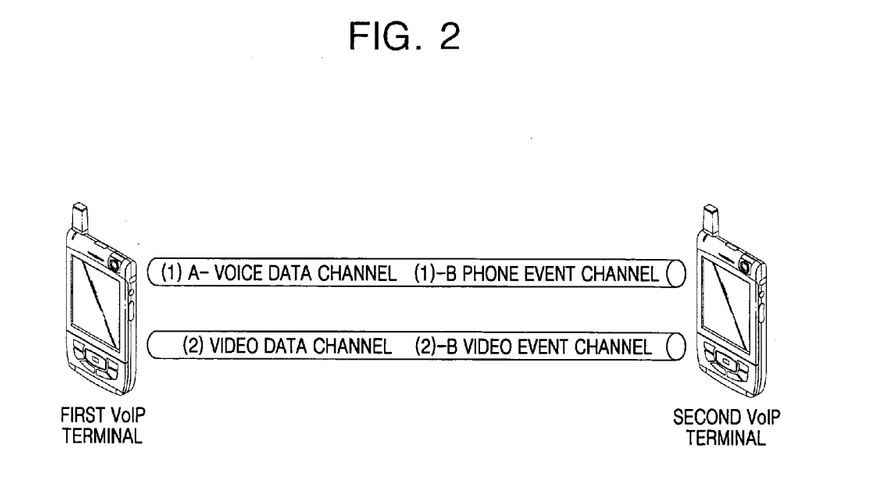
FIG. 2 is a diagram illustrating the configuration of a VoIP video telephone data channel according to an exemplary embodiment of the present invention.

FIG. 2 is a diagram illustrating the configuration of a Voice over Internet Protocol (VoIP) video telephone data channel according to an exemplary embodiment of the present invention.

Referring to FIG. 2, the VoIP video telephone data channel according to the invention is composed of two real-time transport protocol (RTP) channels, i.e., a voice data channel and a video data channel, as in FIG. 1.

The voice data channel includes a signal channel for a separate phone event process (RFC 2833) in order to accommodate dual-tone multi-frequency (DTMF) signaling. The video data channel may include a video data channel for transmitting an image as shown in FIG. 1, and also a separate video event channel for transmitting a video event index.

Figure 3:
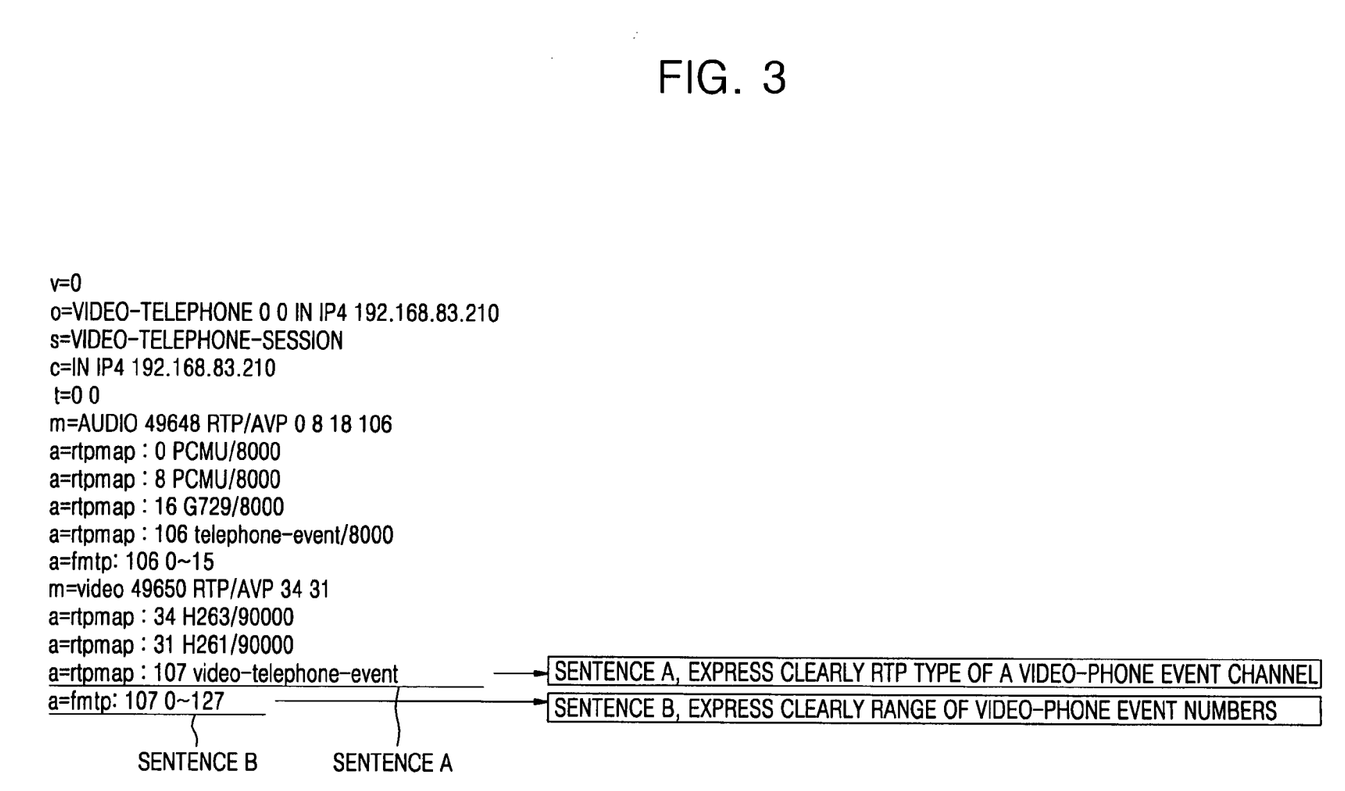
FIG. 3 illustrates the configuration of VoIP session establishment information according to an exemplary embodiment of the present invention.

FIG. 3 illustrates the configuration of VoIP session establishment information according to an exemplary embodiment of the present invention.

Session Initiation Protocol (SIP) is a signaling protocol for establishing, modifying and terminating an Internet-based multimedia service session. The signaling protocol serves to exchange information for controlling a message session between subjects wanting to exchange messages.

Among the signaling protocols, Session Advertise Protocol (SAP) is used to provide session information to a group of concern, to invite a correspondent desiring to talk to participate in the session through the SIP, and to exchange information relating to a media type to be provided through Session Description Protocol (SDP). In addition, RTP information described in the SDP may be used to provide real-time multimedia service.

More specifically, FIG. 3 illustrates an example of session establishment information which a VoIP terminal exchanges after establishing a session using SIP. There is a difference in sentences A and B between the session establishment information of FIG. 3 and common session establishment information.

Sentence A pronounces that a video event is defined with respect to an established session. In this regard, the phrase "rtpmap: 107" indicates that the video telephone event is received at an RTP payload type value, 107. If the RTP payload type value in the session establishment information including sentence A is 107, a receiving VoIP terminal recognizes that the video event is received.

The expression "fmtp: 107 0~127" in sentence B indicates that a value of a video event field, that is, a video event index, can range from 0 to 127. Table 1 illustrates an example of events indicated by respective video event index values, in which the video event index values range from 0 to 127. To this end, the video event index needs to have a total of 7 bits. Of course, the video event index is not necessarily limited to the range of 0 to 127. For additional events, the fmtp value in sentence B is modified and the session is established.

Table 1 shows a definition of video events according to the above video event indexes. As shown in Table 1, when the video event index is 0, it indicates an event displaying a screen blank animation. The video events having a video event index ranging from 1 to 31 correspond to a screen blank event using a user-defined image or animation. The video event having an index of 32 indicates a screen standby event using an image stored in a terminal, and the video event having an index of 33 to 63 is a screen standby animation event using the user-defined image. In this respect, an encoding scheme, such as WBMP, BMP, GIF, JPEG, H.262, H.261, MPEG 2, MPEG 4, etc., can be used to transmit the user-defined image. Depending on each encoding scheme, the video event index has a different value. Finally, the video event having a range of 64 to 79 corresponds to a video event related to the state of the VoIP terminal. The video event having a value from 80 to 127 corresponds to an event reserved for future use.

TABLE 1

| No. | Definition of Event | Description of Event |
| --- | --- | --- |
| 0 | Screen blank animation | When a user requests the screen blank, a pre-defined blank animation is played. |
| 1~31 | User-definedscreen blank animation | When a user requests the screen blank, User-transmitted blank animation is played.<br>15: WBMP<br>16: BMP<br>17: GIF<br>18: JPEG<br>19: H.263<br>20: H.261<br>21: MPEG 2<br>22: MPEG 4 |
| 32 | Screen standby animation | When the user requests the screen standby, a pre-defined standby animation is played. |
| 33~63 | User-defined screen standby animation | When the user requests the screen standby, the user-transmitted standby animation is played.<br>48: WBMP<br>49: BMP<br>50: GIF<br>51: JPEG<br>52: H.263<br>53: H.261<br>54: MPEG 2<br>55: MPEG 4 |
| 64~79 | Terminal operation related animation | 64: Camera failure<br>65: Image data transmission error<br>66: Image data reception error |
| 80~127 | | Reserved for future use |

A method of establishing a session between the transmitting and receiving VoIP terminals using SIP has been described above. The format of an RTP packet transmitted and received by the VoIP terminal after session establishment will now be described.

Figure 4:
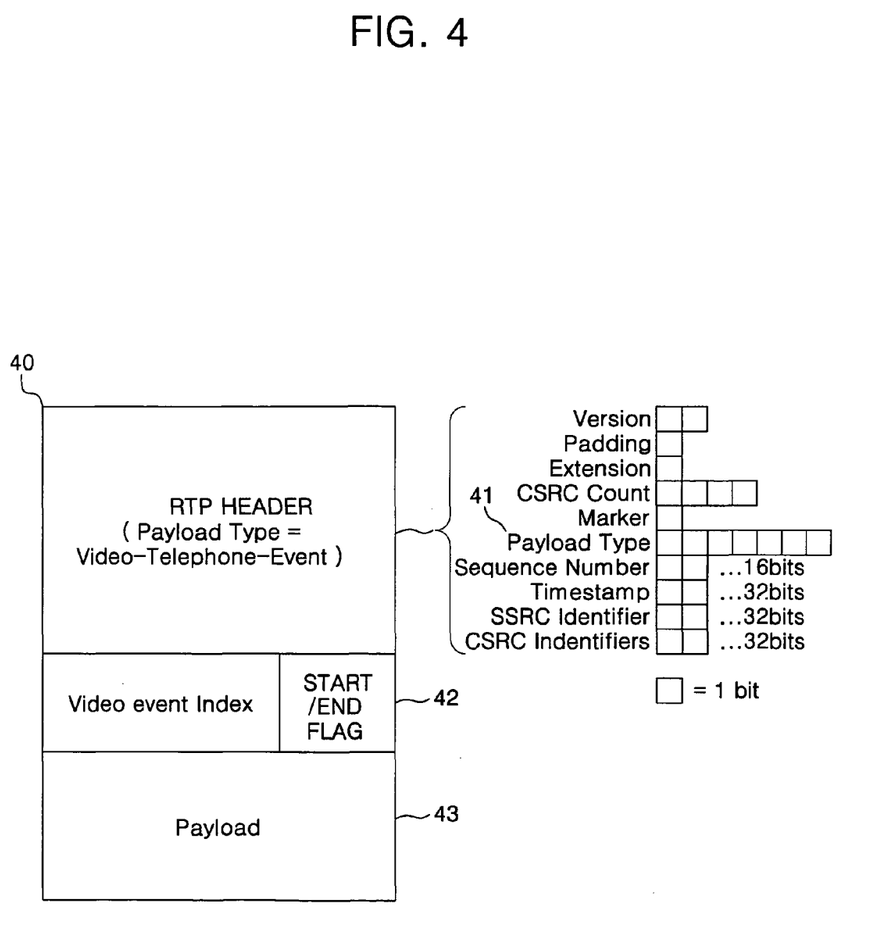
FIG. 4 is a block diagram illustrating the configuration of a real-time transport protocol (RTP) packet through which a video event is transmitted and received according to an exemplary embodiment of the present invention.

FIG. 4 is a block diagram illustrating the configuration of a real-time transport protocol (RTP) packet through which a video event is transmitted and received according to an exemplary embodiment of the present invention.

When a terminal uses a real-time application such as an Internet phone, it transmits a packet using RTP. Voice and video data inputted by a user and transmitted through a user datagram protocol (UDP) packet are included in the RTP packet 40. Thus, FIG. 4 illustrates the structure of the RTP packet 40 according to the present invention.

In the latter regard, Version field indicates a version of the RTP, and Padding field indicates unused bytes in a packet for integrity check. The eXtension field indicates whether an extension header exists. The CSRC Count field indicates the number of CSRC indicators subsequent to a fixed header. For example, in the case of a conference, the CSRC Count field is used the Marker indicates a marker bit.

The Payload Type field 41 indicates a type of payload. The Payload Type field 41 includes information indicating that the RTP packet 40 is for a video event. Specifically, when the session is established according to the session establishment information of FIG. 3, the Payload Type field 41 has a value of 107.

The Video event index field includes a video event number. For example, as shown in Table 1, when the Video event field has a value of 48, the RTP packet 40 is for a screen standby event using a user-defined image or animation.

It can be determined from the Start/End flag 42 whether the RTP packet 40 indicates the start or end of the video event. For example, when the Start/End flag 42 is 1, the RTP packet 40 indicates the start of an event according to the video event index. On the other hand, when the Start/End flag 42 is 0, the RTP packet 40 indicates the end of an event according to the video event index.

The Payload field 43 is an area storing data on a user-defined image or animation. For a video event corresponding to 0 and 32 of Table 1, the Payload field 43 does not include data such as an image, whereas for a video event corresponding to 1 to 31 and 33 to 64, the Payload field 43 includes an image or moving picture data.

Figure 5:
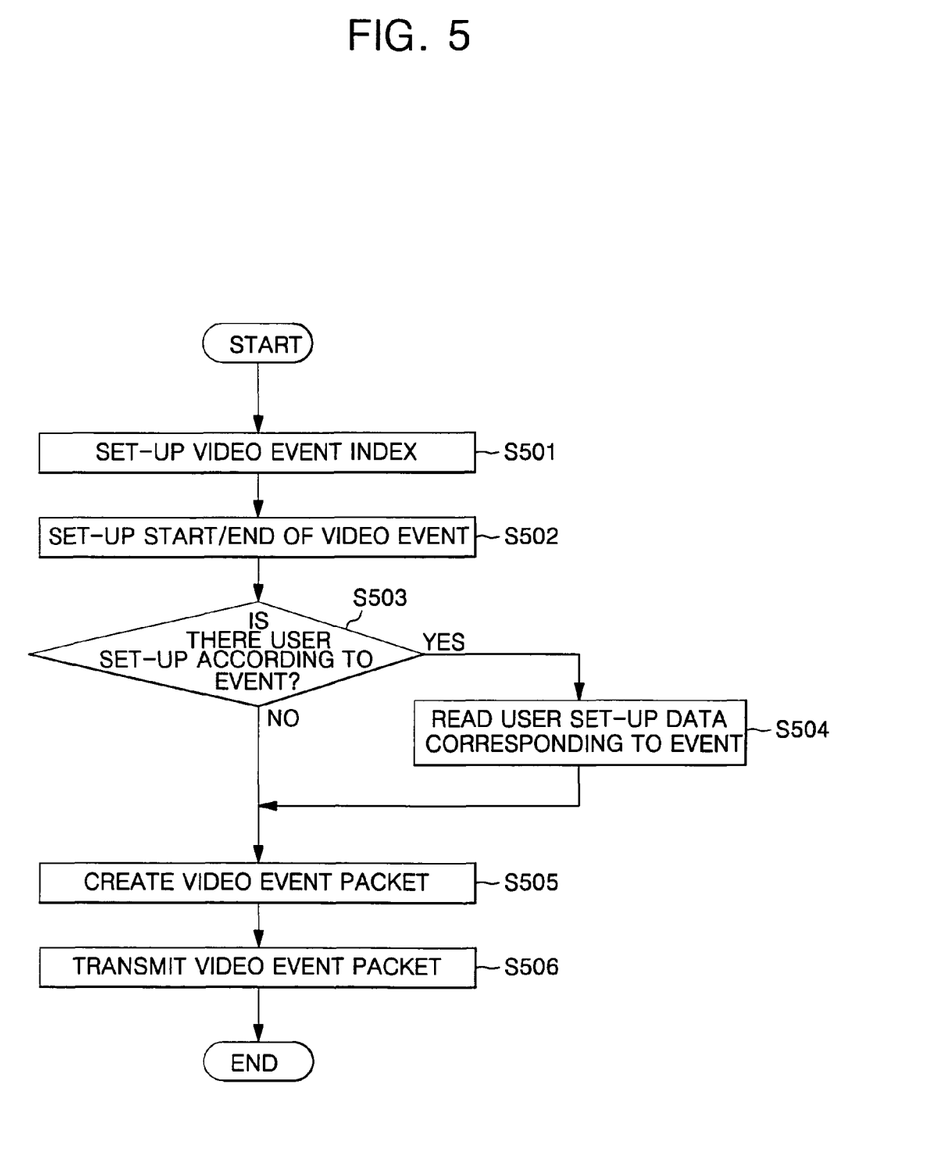
FIG. 5 is a flowchart of a procedure for transmitting a video event according to an exemplary embodiment of the present invention.

FIG. 5 is a flowchart of a procedure for transmitting a video event according to an exemplary embodiment of the present invention.

A video event index to be transmitted upon occurrence of a video event, such as screen blank or camera failure, is set (S501). For example, when the screen blank event occurs due to manipulation by a user, the video event index becomes 0 unless set otherwise by the user. When set by the user, the video event index becomes a value from 1 to 31. An RTP packet can be correspondingly set to indicate the start and end of the event (S502). Then, it is determined whether the occurring event uses a user-defined image (S503). If there is a separate image for the video event to be transmitted by a sender, an image, a moving picture, an animation and the like, designated by the user, are received from a memory (S504).

A VoIP terminal creates a data packet for the video event (S505). Such a data packet has the structure of the RTP packet described in FIG. 4. The Payload Type specified in the session establishment process is indicated in the Payload Type field of the RTP packet, and the index of the event set in step S501 is stored in the Video Event Index field. If the user-designated image or animation is received in step S504, the data according to the image or animation will be stored in the Payload part of the RTP packet. If the user-defined image is not received in step S504, the RTP packet will be created to include the video event index only. The thus created RTP packet is transmitted to a correspondent VoIP terminal with which the session is established (S506).

Figure 6:
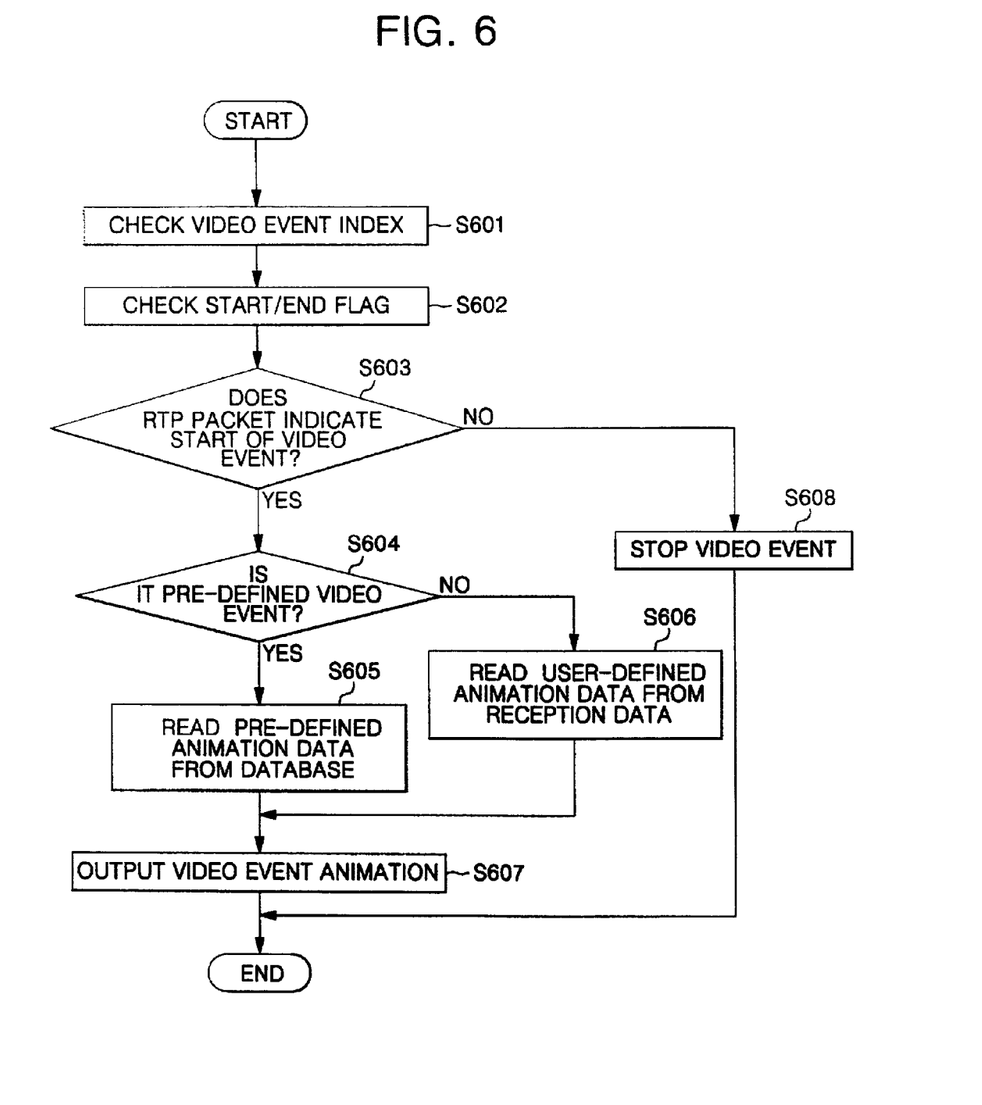
FIG. 6 is a flowchart of a procedure for receiving a video event according to an exemplary embodiment of the present invention.

FIG. 6 is a flowchart of a procedure for receiving a video event according to an exemplary embodiment of the present invention.

The procedure for receiving the video event is the reverse of the video event transmission procedure described in FIG. 5. First, the VoIP terminal receiving the RTP packet senses the Payload Type included in the header of the RTP packet and checks the video event index (S601). The terminal also checks the Start/End flag of the received RTP packet (S602) and determines whether the packet indicates the start or the end of the video event (S603).

If the received RTP packet indicates the start of the event, the VoIP terminal checks the video event index and determines whether the video event uses a pre-defined image or not (S604). If the video event uses the image stored in the receiving VoIP terminal in advance, the VoIP terminal reads an image or an animation corresponding to the video event index from its own database or memory (S605). However, if it is determined in step S604 that the received event should use a user-defined image or animation, the received payload of the RTP packet is extracted and the user-defined image or animation is read (S606). The VoIP terminal then outputs the image or animation read in step S605 or S606 (S607).

The output of the image or animation is continuously performed until an RTP packet indicating the end of the video event is received. That is, if the RTP packet received in step S603 indicates the end of the video event, the video event is terminated so that output of the image or the moving picture is discontinued (S608).

Figure 7:
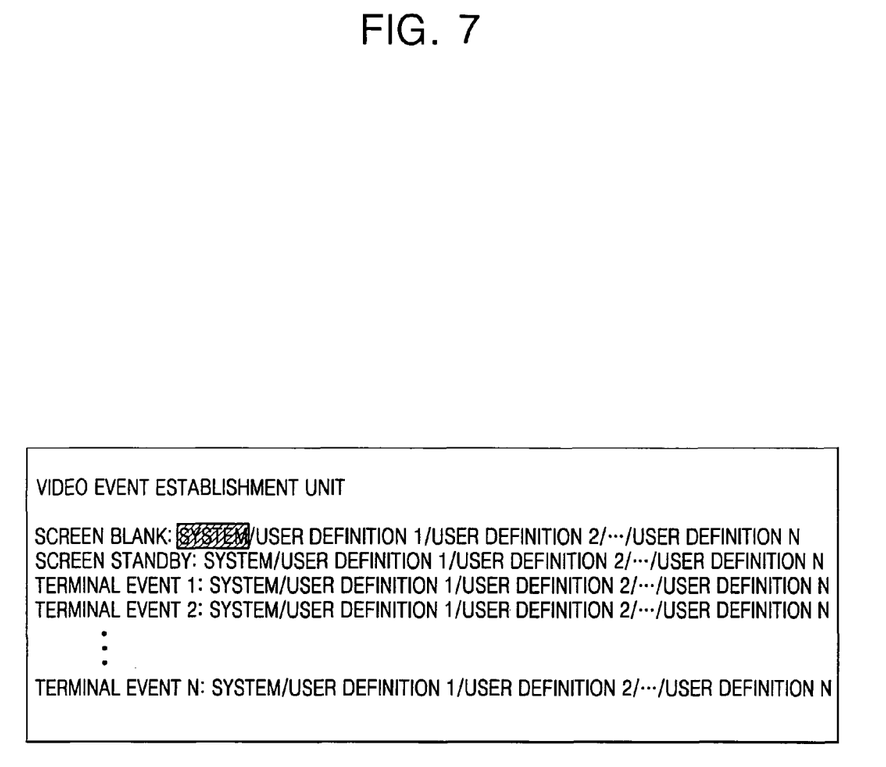
FIG. 7 illustrates a screen for setting a video event according to another exemplary embodiment of the present invention.

FIG. 7 illustrates a screen for setting a video event according to another exemplary embodiment of the present invention.

A user can set, on his/her terminal, whether he/she will use an image or animation previously stored in a VoIP terminal or a user-defined image or animation for each video event.

If the user chooses "system" in a video event setting portion, the image or animation previously stored in the VoIP terminal is used. Specifically, if the user sets such a function, the VoIP terminal transmits and receives an RTP packet having the Payload Type field into which an event index value alone is inserted when the user requests the screen blank or screen standby or a terminal event occurs.

However, if the user sets "user definition" on the video event setting portion, the transmitting VoIP terminal uses a user-defined image or animation. Thereafter, if the screen blank, the screen standby or a terminal related event occurs, an index value indicating the user-defined event is inserted into the Payload Type field of the RTP packet transmitted by the VoIP terminal, and data obtained by encoding the designated image or animation using the above encoding scheme is inserted into the payload. As such, there may be several types of user-defined images, and the user can choose one of "user definition 1" to "user definition n" as shown in FIG. 7.

Figure 8:
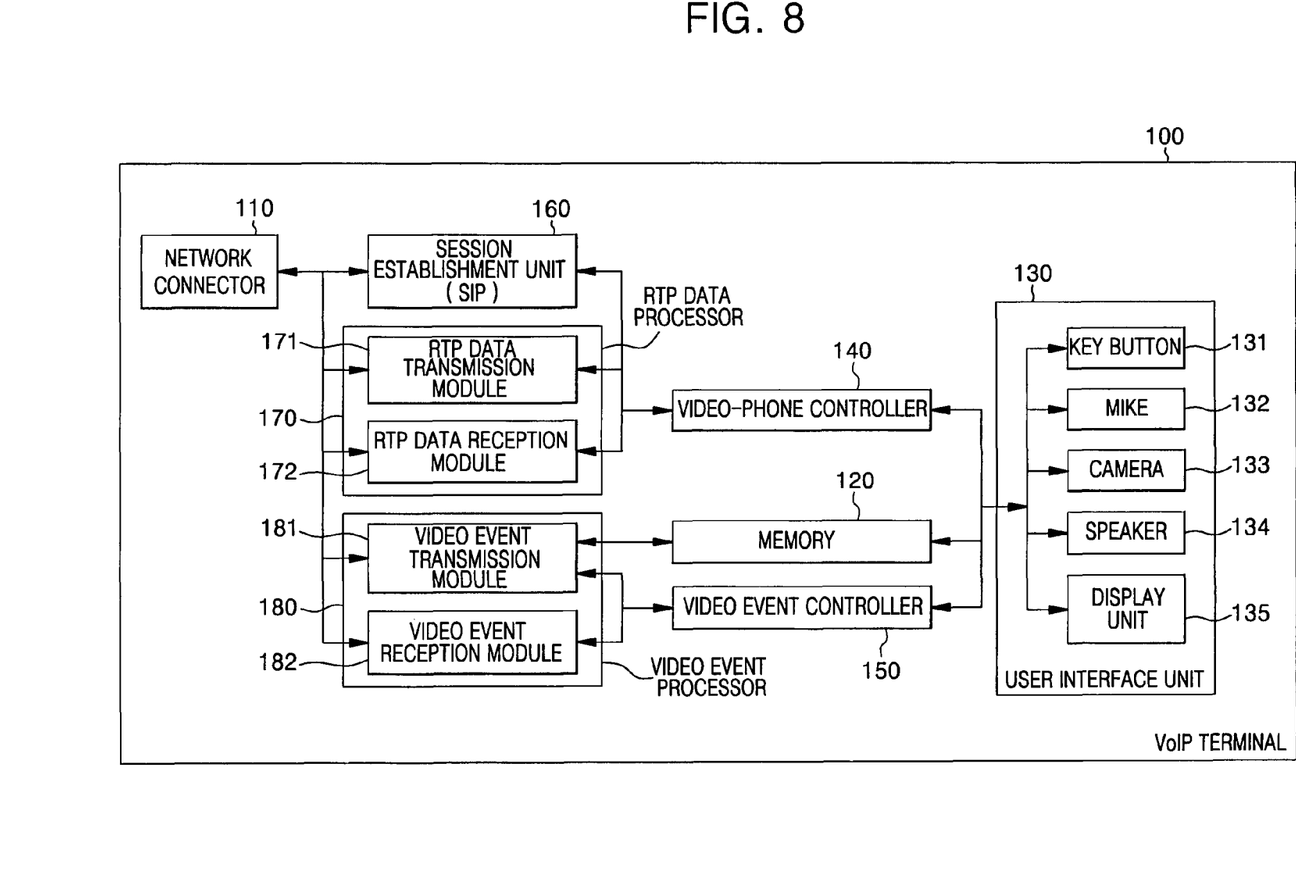
FIG. 8 is a block diagram of the internal configuration of a VoIP terminal for video communication according to an exemplary embodiment of the present invention.

FIG. 8 is a block diagram of an internal structure of a VoIP terminal of a video telephone according to an exemplary embodiment of the present invention.

Referring to FIG. 8, the VoIP terminal 100 comprises a network connector 110, a memory 120, a user interface unit 130, a video telephone controller 140, a video event controller 150, a session establishment unit 160, an RTP data processor 170, and a video event processor 180.

The network connector 110 is for exchanging a packet related to an RTP packet or session establishment with another VoIP terminal. The memory 120 stores not only an application program for the VoIP terminal 100, but also an image or moving picture mapped to a video event index. When the user desires to transmit a predetermined video event, the memory 120 stores a user-defined image, moving picture, etc. Such an image or moving picture can be stored in a database. The user interface unit 130 is an input/output unit allowing the user to use the VoIP terminal 100 and may include a microphone 132, a speaker 134, a camera 133, a display unit 135, a key button 131, and soon.

Upon receipt of a request for video communication through the user interface unit 130, the video telephone controller 140 drives the camera 133, the display unit 135, etc., of the user interface unit 130, and controls the session establishment unit 160 and the RTP data processor 170 to transmit and receive data. When the user requests to transmit the video event, the video event controller 150 controls operation of the video event processor 180.

The session establishment unit 160 establishes a session using SIP for video communication with the other VoIP terminal (not shown). The session establishment unit 160 establishes the session with the other VoIP terminal using session establishment information defining a video event, as illustrated in FIG. 3.

The RTP data processor 170 is composed of an RTP data transmitting module 171 and an RTP data receiving module 172. The RTP data transmission module 171, like the conventional VoIP terminal 100, converts a user's voice input through the microphone 132 and an image taken by the camera 133 using an encoding scheme according to the session establishment information of FIG. 3, thereby creating an RTP packet, and transmits the RTP packet through the network connector 110. The RTP data reception module 172 extracts data for video communication from the RTP packet received by the network connector 110, and delivers and outputs the data to the user interface unit 130.

The video event processor 180 is composed of a video event transmission module 181 and a video event reception module 182. The video event transmission module 181 creates RTP data corresponding to a required video event when the user requests to transmit the video event using the key button 131. Specifically, the Payload Type field of the RTP packet includes a value of the video event payload type, and the video event index field includes a value of the video event index. If the user wants to transmit the user-defined image or moving picture, image or moving picture data encoded using the encoding scheme specified by the video event index are inserted into the payload of the RTP packet. If the user requests to start the video event, the video event transmission module 181 creates an RTP packet by setting the Start/End flag of the Payload Type to 1. On the other hand, if the user requests to end the video event, the video event transmission module 181 creates an RTP packet by setting the Start/End flag of the Payload Type to 0.

The video event reception module 182 checks the Start/End flag included in the Payload Type. If the Start/End flag is 1, the operation corresponding to the video event is performed. The video event reception module 182 extracts an index of the Payload Type field from the RTP packet, and outputs an image or a moving picture corresponding to the index to the user interface unit 130. Specifically, if the video event index corresponds to one of 0, 32 and 64~79, the video event reception module outputs an image or moving picture stored in the memory mapped to the index through the display unit 135 and the speaker 134. If the video event index corresponds to one of 1~31 and 33~63, the video event reception module 182 decodes the image or moving picture contained in the payload of the RTP packet using a CODEC indicated in Table 1, and outputs it to the user interface unit 130. If the Start/End flag included in Payload Type is 0, the video event reception module 182 discontinues provision of the image or moving picture corresponding to the video event included in the Payload Type.

While the present invention has been described in connection with the VoIP terminal and the VoIP video communication method using SIP, it will be apparent that the invention can be applied to cases wherein other protocols, such as H.323 or Megaco, are used.

With the method and apparatus for transmitting and receiving a video event in video communication according to the present invention, unnecessary waste of bandwidth in sending user and terminal state information can be prevented by transmitting and receiving a pre-defined index alone without transmitting a real-time data type image.

While the present invention has been described with reference to exemplary embodiments thereof, it will be understood by those skilled in the art that various changes in form and detail may be made therein without departing from the scope of the present invention as defined by the following claims.

What is claimed is:

1. A method for Voice over Internet Protocol (VoIP) video communication, the method comprising:
    establishing a VoIP session between a first terminal and a second terminal using session establishment information defining a video event corresponding to one of a user state and a terminal state;
    creating and transmitting, at the first terminal, a data packet comprising a video event index corresponding to the video event; and
    receiving the data packet at the second terminal, extracting the video event index, and outputting an image mapped to the extracted video event index,
    wherein a value of the video event index is determined, at least in part, on a type of encoding of the video event, and
    wherein the video event comprises at least one of a screen blank event, a screen standby event, a terminal camera failure event, a terminal image data transmission disable event, and a terminal image data reception disable event.

2. The method of claim 1, wherein the data packet has a structure of a Real-time Transport Protocol (RTP) packet.

3. The method of claim 2, wherein creating the data packet comprises creating the RTP packet comprising a video event Payload type in a Payload Type field.

4. The method of claim 3, wherein the RTP packet further comprises user-defined image data corresponding to the video event Payload type in the Payload Type field.

5. The method of claim 1, wherein outputting the image at the second terminal comprises extracting and outputting user-defined image data included in a Payload field of an RTP packet.

6. The method of claim 1, further comprising receiving, at the second terminal, information on whether the first terminal uses user-defined image data from a user.

7. The method of claim 1, wherein creating the data packet comprises creating the data packet comprising a Start/End flag of the video event, the Start/End flag indicating at least one of a start and an end of the video event.

8. The method of claim 7, wherein, at the second terminal, the image mapped to the extracted video event index is outputted upon receipt of the data packet comprising the Start/End flag indicating the start of the video event.

9. The method of claim 7, further comprising discontinuing output of the image mapped to the extracted video event index upon receipt of a data packet comprising the Start/End flag indicating the end of the video event.

10. The method of claim 1, wherein establishing the VoIP session between the first terminal and the second terminal comprises establishing the VoIP session using one of a Session Initiation Protocol (SIP) and an H.323 protocol.

11. A terminal for Voice over Internet Protocol (VoIP) video communication, comprising:
    a memory to map and save a video event index of a video event corresponding to one of a user state and a terminal state to at least one image;
    a session establishment unit to establish a VoIP session between the terminal and a second terminal using session establishment information defining the video event; and
    a video event processor to transmit and receive a data packet comprising the video event index, and to retrieve and output an image mapped to the video event index,
    wherein a value of the video event index is determined, at least in part, on a type of encoding of the video event, and
    wherein the video event comprises at least one of a screen blank event, a screen standby event, a terminal camera failure event, a terminal image data transmission disable event, and a terminal image data reception disable event.

12. The terminal of claim 11, wherein the data packet has a structure of a real-time transport protocol (RTP) packet.

13. The terminal of claim 12, wherein the video event processor comprises:
    a video event transmission module to create and transmit the RTP packet comprising a Payload Type field and the video event index; and
    a video event reception module to extract the video event index in the received RTP packet, and to retrieve, from a memory and output an image mapped to the video event index.

14. The terminal of claim 13, wherein the video event transmission module creates and transmits the RTP packet comprising user-defined image data corresponding to the video event index, and the video event reception module extracts and outputs the user-defined image data in the Payload field of the received RTP packet.

15. The terminal of claim 11, wherein the data packet further comprises a video event Start/End flag indicating at least one of a start and an end of the video event.

16. The terminal of claim 15, wherein the video event processor outputs an image mapped to the video event index upon receipt of the data packet comprising the video event Start/End flag indicating the start of the video event.

17. The terminal of claim 15, wherein the video event processor discontinues output of the image mapped to the video event index upon receipt of the data packet comprising the video event Start/End flag indicating the end of the video event.

18. The terminal of claim 11, wherein the session establishment unit establishes the VoIP session with the second terminal using one of a Session Initiation Protocol (SIP) and an H.323 protocol.

* * * * *